United States Patent [19]
Geyer

[11] Patent Number: 5,641,227
[45] Date of Patent: Jun. 24, 1997

[54] EXTRUSION AND REFINING APPARATUS AND METHOD

[76] Inventor: Paul Geyer, 210B N. Lindell Rd., Greensboro, N.C. 27403

[21] Appl. No.: 429,842

[22] Filed: Apr. 27, 1995

[51] Int. Cl.⁶ .................................................. B28C 1/16
[52] U.S. Cl. ..................... 366/78; 366/80; 366/82; 366/89; 366/90
[58] Field of Search .................... 366/78, 79, 81, 366/82, 88, 89, 90, 318, 319, 322, 323, 324; 425/205, 208, 209

[56] References Cited

U.S. PATENT DOCUMENTS

| | | |
|---|---|---|
| 2,744,287 | 5/1956 | Parshall et al. |
| 3,375,549 | 4/1968 | Geyer. |
| 3,461,497 | 8/1969 | Geyer. |
| 3,745,200 | 7/1973 | Geyer. |
| 3,802,670 | 4/1974 | Okada et al. ............ 366/88 |
| 3,889,932 | 6/1975 | Brandis .................. 366/82 |
| 3,981,658 | 9/1976 | Briggs ................... 366/82 |
| 4,075,712 | 2/1978 | Geyer. |
| 4,184,772 | 1/1980 | Meyer .................... 366/88 |
| 4,408,725 | 10/1983 | Wenger et al. ............ 366/79 |
| 4,462,692 | 7/1984 | Boguslawski ............. 366/90 |
| 4,708,623 | 11/1987 | Aoki et al. .............. 366/81 |
| 4,944,597 | 7/1990 | Geyer ................... 366/79 |
| 4,964,729 | 10/1990 | Holzer et al. ........... 366/82 |
| 5,129,729 | 7/1992 | Geyer ................... 366/81 |
| 5,217,303 | 6/1993 | Geyer ................... 366/89 |
| 5,332,314 | 7/1994 | Geyer ................... 366/82 |
| 5,348,388 | 9/1994 | Geyer ................... 366/82 |

FOREIGN PATENT DOCUMENTS

| | | | |
|---|---|---|---|
| 3009399 | 9/1981 | Germany | 366/79 |

*Primary Examiner*—Tony G. Soohoo

[57] ABSTRACT

An extruder apparatus for use in straining refining, separating and extruding thermo-plastic and rubber like process material includes a rotor positioned in barrel with a barrier section located between two barrel sections. The portion of the rotor in the barrier section has a smooth surface and the smooth surface and the barrier section are conical. The barrier section includes receiving and sending grooves separated by barriers. All material passing through the barrier section passes between the barriers and the smooth rotor section. Longitudinal movement of the smooth rotor section changes the clearance between the barriers and the rotor to restrict flow between a maximum flow and a closed position. The clearance can be adjusted so that different materials can be extruded in the same apparatus and adiabatic flow can be achieved. Discharge ports at the downstream end of the receiving grooves port rejected material to atmosphere.

8 Claims, 3 Drawing Sheets

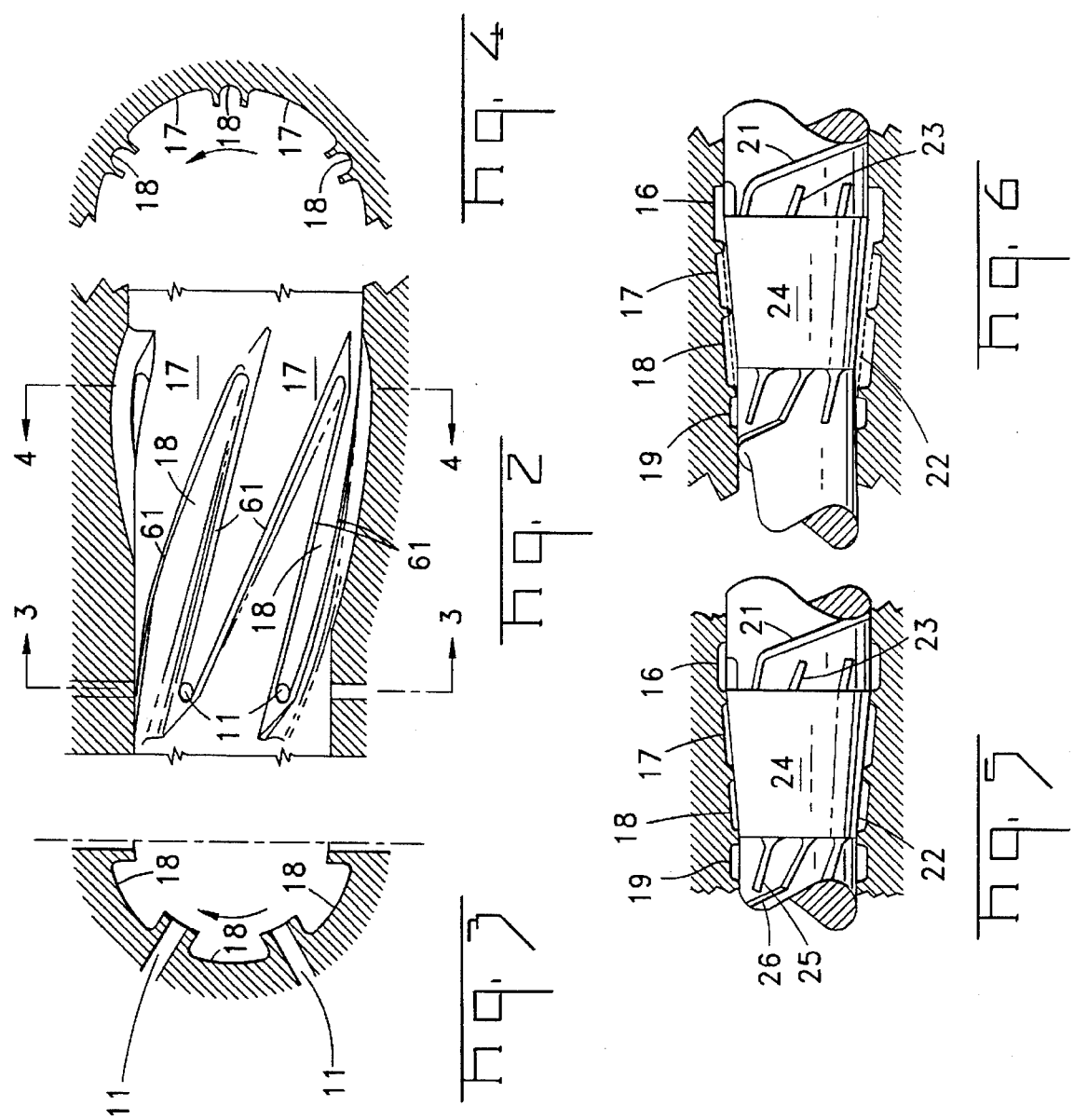

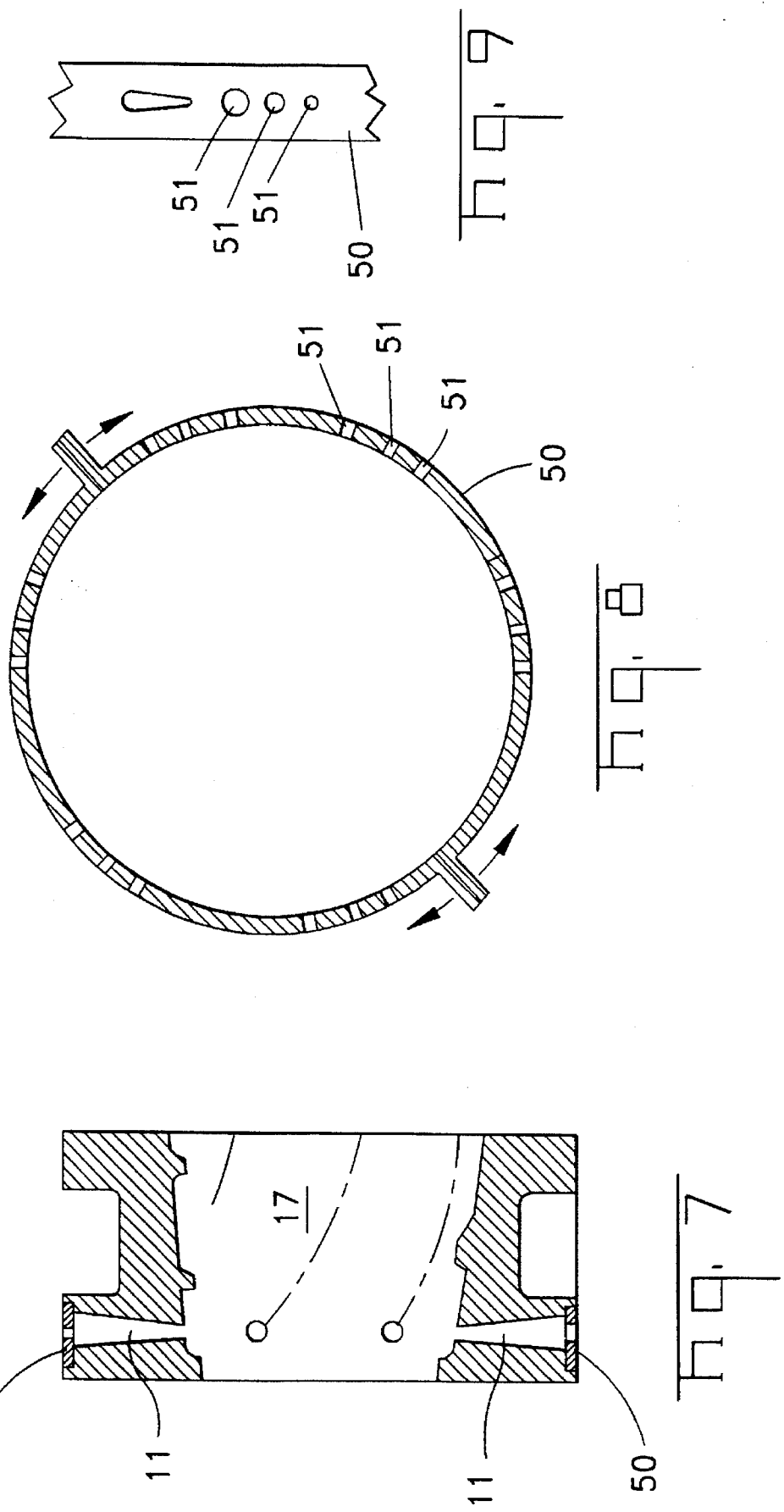

EXTRUSION AND REFINING APPARATUS AND METHOD

RELATED APPLICATIONS

This invention is for a method and apparatus to progressively produce the highest quality possible by using new and improved versions of my U.S. Pat. No's 2,744,287; 3,375,549; 4,075,712; and 4,872,761.

BACKGROUND OF THE INVENTION

1. Field of the Invention

This invention relates to an improved method and apparatus for the mixing and extrusion of thermoplastic and thermosetting materials, more particularly, this invention concerns an improved screw or worm type apparatus and method for the mixing, refining, separating and extruding variable viscosity natural and synthetic rubber and other elastic materials. Unless otherwise indicated the term extruder, as used herein, refers to and includes a screw or worm type apparatus used to obtain an extrusion of the desired cross-sectional configuration or for mixing, blending and processing of thermo-plastic and thermo-setting materials.

2. Description of Prior Art

To evaluate the level of prior art, the flow of the process material through the present mixing equipment is as follows:

THE TWO ROLL MILL with the material banded one roll generates a band of material of which only the outer part is worked, as the inner part adheres to the roll surface and thereby receives little or no working at all. Material arriving at the mill nip, as formed between the two rolls, has to "PUSH" its way into the mill bank and thereby relaxes any strain previously established in the material. When the material is in the bank, the shearing action is directed to the path of least resistance, the already worked material.

THE INTERNAL MIXER as used to assemble compounds, has two in running rotors with configurations designed to shear the baled polymer so as to develop surface area, to incorporate the additives uniformly, and to blend the batch to a uniform material. This multiple purpose design actually develops turbulent flow which directs the imposed shear to the path of least resistance, incorporates the additives with little relation to the designed amount, and the mixing at the center of the chamber exceeds that at the extremes. Post mixer blending at best produces a blend of over and under mixed material. Loose black dropped with the batch is the rule rather than the exception. Plateau type chemicals are required to produce usable material.

THE HELICAL GROOVE EXTRUDER imparts shear to material contacting the rotor grooves and barrel bore. This action moves the material at the outer part of the groove to flow from the leading edge to the trailing edge of the groove. Arriving at the training edge it must "PUSH" its way down and back under to arrive at the leading to complete the cycle. Also the imposed shear is directed to already worked material tending to create a cold core surrounded with warmed material, an action which generates non-uniform mixing.

THE TRANSFERMIX EXTRUDER which transfers the material from the rotor to the barrel and then back to the rotor with barrel grooves extending the length of the exchange. The first half receives the material from the rotor and the second half transfers the same material back to the rotor. The resulting action is one that winds in and winds out the same material, which tends to rework the same material. The net result is mixing inferior to mixing where newly aligned material is subjected to the barrel to rotor transfer.

THE BARRIER TYPE EXTRUDER has a fixed clearance between barrier tops and the barrel bore. As different materials and different viscosities may require different clearances, the effect of wear and the size of material to be rejected, etc, limits the use of the Barrier Screw to the thermoplastic industry.

Recognizing that the present mixing equipment can be improved requires new and improved mixing equipment that does not exist. Although laboratory equipment out performed factory mix, the expense of changing factory mixing equipment invited a status quo situation.

SUMMARY OF THE INVENTION

A new and novel feature of the barrier section that is conical in shape so that longitudinal movement of the rotor to the barrel member changes the clearance barrier groove tops to barrel bore. As different barrier clearances change extruder capacity, extruder capacity is also controllable and thereby temperature of extrusion is controllable. The elimination of wasted shearing permits the extrusion to be made with the same power input that is required to warm the material, thus adiabatic extrusion is established with the result that the temperature of extrusion does not change with screw speed.

This invention relates to a method and apparatus for the mixing, refining, separating and extruding thermoplastic and thermosetting materials.

It is the object of this invention to provide a new and improved method for refining material and separating the oversize and less fluent material to a separate discharge port.

It is another object of this invention is to provide a new and improved apparatus suited to the aforesaid method.

It is a further object of this invention to provide a new and improved method and apparatus suited to the processing of various plastic materials wherein less fluent material is subjected to extra working so as to improve material uniformity.

It is a still further object of this invention to provide a new and improved barrier apparatus which is adjustable as to the clearance, barrier groove tops to the coacting rotor.

It is the object of this invention to separate the rotor to barrel transfer from the barrel to rotor transfer with the barrier section so that newly aligned material is sheared at the transfer.

It is another object of this invention to minimize helical groove extrusion so as to minimize temperature stratification.

It is another object of this invention to position the barrier grooves in the barrel member rather than in the usual rotor member.

It is still a further object of this invention that the barrel barriers are all of the same diameter, not under cut as other barrier screw designs.

It is the object of this invention that endwise adjustment of the rotor to the barrel member controls extrusion capacity and thereby also controls extrusion temperature.

It is the object of this invention to provide mixing geometry which accomplishes the mixing and extrusion with work input only equal to the work required to raise the temperature to the designed level and to thereby make the extrusion adiabatic. (No change in extrusion temperature with changes in rotor speed.)

It is a feature of the present invention to provide an improved extrusion apparatus adjustable to the requirements of the process material so that the best processing can be achieved.

Another feature is to provide an improved apparatus which intensively shears all of the material that passes over the barriers.

Still another feature is to provide an improved apparatus that retards and provides extra working to the less fluent material.

It is yet another feature to provide a rotor to barrel transfer of the material through the shear zone generated by the movement of the rotor relative to the barrel member.

Another feature is to achieve complete mixing in a short adiabatic extruder, i.e. work input is only equal to the work required to work the process material.

Still another feature is to provide means by which the clearance, barrier tops to the coacting rotor member is adjustable so that the shear rate over the barrier is adjustable.

It is yet another feature that oversize and less fluent material is led off to a separate discharge port.

Another feature is that the capacity per turn of the extruder is controllable by longitudinal movement of the rotor member to the barrel member.

Still another feature is that extrusion temperature control is provided by longitudinal movement of the rotor to the barrel member.

Yet another feature is that the barrier section coacts with a smooth rotor member, a means which generates pulseless extrusion.

As yet another feature, the conical barrier section barrel groove tops are all of the same diameter, different than previous barrier screws.

Still another feature is the separation of the rotor to barrel transfer from the barrel to rotor transfer by the barrier section which eliminates the reshearing of already sheared material and thereby improves mixing using the same equipment.

Yet another feature is that a short extruder and high speed operation reduce the investment cost of the extruder and eliminate the usual elaborate cooling systems common to the extrusion warmers.

The apparatus is for the mixing and extrusion of thermoplastic and rubber like materials. More particularly the apparatus includes feed means or a hopper adapted to the injection of the process material into an extruder forcing section. The screw type forcing section is adapted to generate heat, develop extrusion pressure and transport the material to the rotor member of a rotor to barrel transfer section which passes all of the material from the rotor to coacting barrel member receiving grooves and thereby is intensely sheared as it passes from the rotor to the barrel. The barrel member of the rotor to barrel transfer zone receives the material and delivers it to the barrier section barrel receiving grooves, which start at capacity and progresively change to zero capacity at the down stream end of the barrier section. Spaced between the barrier receiving grooves an equal number of barrier barrel sending grooves, which start at zero and progressively increase to capacity at the down-stream end of the barrier section. Oversize and less fluent material, not transported to the sending groove is transported to the downstream end of the barrier section from where it is ported to atmosphere. The accepted refined material, now in the barrel sending groove is directed to the rotor member of the barrel to rotor transfer and thereby is intensely sheared as it passes through shear area in the barrel to rotor transfer zone.

The barrier section is conical in design starting large and ending ar a reduced diameter and is provided with a smooth conical rotor. The design is such that longitudinal movement of the rotor adjusts the clearance between the barrier tooth tops and the rotor, This arrangement can preset the clearance to suit the process material, can adjust for wear and can be set to control extrusion capacity and thereby extrusion temperature. Separating the rotor to barrel transfer zone from the barrel to rotor transfer zone permits the realignment of process material so that the shear, imposed at transfer, is directed to new aligned material and not to reshearing the same material.

The material reaching the rotor grooves is directed downstream to the end forcing section where pressure for the extrusion, if needed, is developed. The smooth rotor design of the barrier section tends to erase the pulsing of the extrusion, which is evidenced in some types of extrusion.

The elimination of reshearing already sheared material and the imposed progressive flow of material permits the use of a short extruder to the extend that adiabatic extrusion is possible i.e. (No change in extrusion temperature as a result of rotor speed changes.)

For a better understanding of this invention together with other further objects thereof, reference is made to the following descriptions taken in connection with the accompanying drawings, and its scope will be pointed out in the appended claims.

BRIEF DESCRIPTION OF THE DRAWINGS

FIG. 2 is a sectional view of the barrel member of the barrier section.

FIG. 3 and 4 are half sectional views of FIG. 2

FIG. 5 is a sectional view of the barrel member of the barrier section showing the coacting rotor in the advanced position, so as to stop all material flow.

FIG. 6 is a sectional view of the barrel member of the barrier section showing the coacting rotor retarded position, so as to generate maximum clearance between barrier groove tops and the coacting rotor member.

FIG. 7 is a side section view of a barrel of the barrier section.

FIG. 8 is a view showing a ring with discharge ports.

FIG. 9 is a top view of a portion of the ring showing holes of different sizes that can be aligned with the discharge ports.

DESCRIPTION OF THE PREFERRED EMBODIMENT

Introduction

Figure 1:
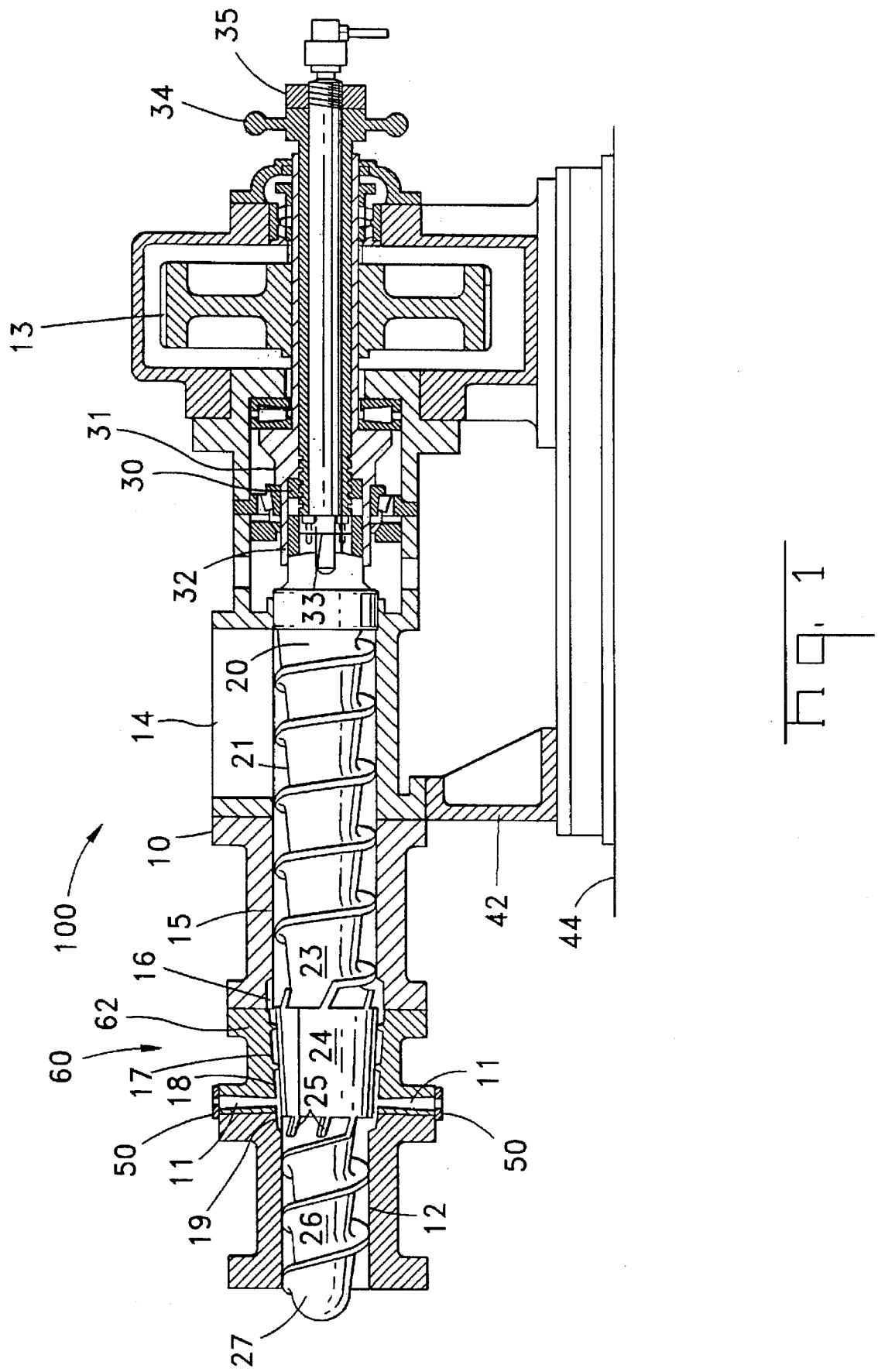
FIG. 1 is a side elevational view of the apparatus employing the invention with the housing and portions of the drive assembly shown in section.

A new and improved method of mixing consists of an extrusion unit consisting of existing Geyer Patents for slab feeding, return screws and extrusion to promote longitudinal blending and a deaerating design at the rotor to barrel entrance. The present invention accepts the material from the hopper 14 and forcing section and provides a rotor to barrel transfer of material which provides cross-shearing of the material as it passes through the shear area generated by the rotation of the rotor relative to the barrel member. The barrel member of this interchange receives the material and transports it to a barrier section 60. The barrier section 60 is provided with receiving grooves 17 with a volume which starts at capacity and progressively decreases to zero in the down-stream direction. Spaced between the receiving grooves 17 is a second set of sending grooves 18, which receive the material passed over the tops of barriers 61 separating the barrier grooves and delivers the material to the barrel to rotor transfer section. The barrel to rotor transfer section, now supplied with newly aligned material, next passes the material from the barrel back through the shear area to the rotor of the enforcing section.

In the present invention the feeding and pressurizing of the process material can be essentially that of modern day practice for the type of material being processed, hot or cold feed of rubber like materials or thermoplastics. The hopper may be constructed in accordance with my U.S. Pat. No. 3,888,469 to deaerate the feed material, when crumb or pelletized rubber is processed, or U.S. Pat. No. 3,632,255 when exceptionally uniform extrusion is required. Also, the present invention is believed to be an improvement over my U.S. Pat. No. 4,981,364.

The material from the hopper (at 14) and the following forcing section is warmed, pressurized and transported through rotor extrusion grooves 21 in the upstream portion of barrel member 10 to a rotor to barrel process material transfer section, where all of the process material is transferred from the rotor 20 and the coacting barrel bore 15 and is intensively sheared as it passes through the shear area generated between the rotor and barrel members. The process material now in the barrel member 15 is transported downstream to the barrel member 62 of the barrel barrier section 60, which is provided with multiple barrier receiving grooves 17 which start at capacity and decrease in capacity to zero at the down-stream end of the barrier section 60. Spaced between the multiple receiving grooves 17 is a second set of grooves, the sending grooves 18, which acquire all of the process material, led off over the tooth to rotor clearance between the tops of barriers 61 and the smooth rotor surface 24. Material not led off by the receiving grooves 17 is passed down-stream to barrel discharge ports 11, which receive the oversize and less fluent material and port it to atmosphere. The material received by the sending groove 18 is directed down-stream to the barrel member 12 of a barrel to rotor transfer, which receives and passes all of the process material, back through the intensive shear area to coacting rotor grooves which coact with helical extrusion grooves 26 to develop pressure to transport and extrude the material to atmosphere via an exit port (at 27).

The barrel barrier section 60 is tapered in diameter and coacts with a smooth tapered diameter rotor section 24 which is arranged to be moved longitudinally to thereby adjust the space between the tapered diameter rotor and the coacting barrel member 62 of the barrier section 60. The tapered barrel bore has all of its extruder grooves conical in diameter so that when fully extended the smooth surface 24 would act as a "cork" and stop all extrusion. Thus, by adjusting the barrier clearance the extrusion rate can be controlled from zero to normal rates.

Description of the Extruder Apparatus

Referring to the drawings, the entire apparatus 100 in accordance with the invention is applied to the continuous straining and refining of hot or cold fed rubber like materials or thermoplastic materials, and when used for extruding the desired product, has all of the advantages as noted in the introduction. The extruder apparatus 100 has a barrel member 10 with bores 15, 12 and a barrier section 60 with grooves 17 and 18, extending there through that acts in conjunction with rotor 20, rotatably mounted therein and adapted for rotation by drive means 13.

The apparatus is provided with a hopper opening 14 through which the material to be processed is entered into apparatus 100. The rotor 20 is provided with an essentially helical extrusion groove 21 which coacts with barrel bore 15 to warm, pressurize, and transport the process material down stream to a rotor to barrel process material transfer section between bore 15 and barrier section 60 and the material is intensely sheared as it passes through the shear area generated between the sections. The lengths of the sections are adjusted so as to accommodate the use of this apparatus with different materials being processed to the fluent phase as the material passes into the conical barrier section 60, the rotor section 24 of which is smooth and the coacting barrel member 62 is provided with grooves 17 and 18. The grooves 17 have an initial volume which starts at capacity and is progressively reduce to zero capacity at the down stream end of the section. Grooves 18, located between grooves 17, start at zero capacity or volume and progressively increase to their full capacity at the end of the barrier section 60. Thus, all of the acceptable process material is led off from grooves 17 to grooves 18. The down stream ends of grooves 17 are provided with discharge ports 11 which direct the rejected oversize and less fluent process material to atmosphere. A rotatable ring 50 is provided with sets openings of various size so that the amount of material ported to atmosphere can be adjusted. The barrel barrier grooves 18 connect with barrel grooves 19, which coacting with rotor grooves 25 form the barrel to rotor transfer section. Again, the process material, now newly aligned longitudinally, is intensely sheared as it passes member to member. Rotor grooves 25 connect to rotor grooves 26 which coact with barrel bore 12 to develop extrusion pressure at discharge to atmosphere at 27.

Rotor longitudinal adjustment is provided by the hand wheel adjustment means 30, 31, 32, 33, 34, and 35 which can move the rotor longitudinally in the barrier section so as to change capacity from zero to full capacity by changing the clearance between the tops of barriers 61 of barrel grooves 17 and 18 and the bore of the barrier section 60. As shown in FIG. 1, the apparatus 100 is positioned on a base 42 that can rest upon a horizontal surface 4, such as a floor. As shown in FIG. 1, the barriers 61, defining the barrier grooves 17, 18 extend radially inward and longitudinally on the barrier section 60.

FIG. 2 is a sectional elevational view of the tapered barrel member of the barrier section and in conjunction with FIG. 3 and FIG. 4 detail the barrier grooves 17 and 18. Groove 17 starts at capacity and progressively reduces to zero capacity at the down stream end of the barrier section. Barrier groove 18 starts at zero capacity and progressively increases to capacity at the down stream end of the section.

FIG. 5 is a view, part in section which shows the rotor member fully extended so that in effect it can act as a "cork" and stop all extrusion flow. FIG. 5 thus shows the rotor in a first position in which all flow is stopped.

FIG. 6 is a view, part in section, which shows the rotor 24 retarded so as to provide clearance rotor surface to barrel tooth tops at maximum and, thereby, permitting full extruder capacity. FIG. 6 thus shows the rotor in a second position. The rotor is longitudinally shiftable between the first and second positions to vary the flow though the extruder.

FIG. 7 is a sectional view of the barrel of the barrier section which shows the ports 11 which lead off the over size and less fluent process material. Ring 50 is rotational so that various capacity ports can be selected to lead off the oversize and less fluent material.

FIGS. 8 and 9 are detail views of ring 50 showing that various size openings 51 can be selected to control the amount of lead off process material that is insufficiently fluent to pass through the barrier section 60.

What I claim is:

1. An apparatus for processing thermo-plastic and rubber like materials by extruding and straining the materials, said apparatus comprising;

a barrel extending in a longitudinal direction and having multiple sections, said barrel sections each having a cylindrical bore;

a rotor positioned in said cylindrical barrel bore and rotatable relative to said cylindrical barrel, said rotor including extrusion grooves extending around an upstream end of said rotor and a downstream end of said rotor for transporting said materials through said barrel, said extrusion grooves being interrupted by a smooth conical section intermediate said upstream and downstream ends of said rotor; and a conical barrier section positioned between separate sections of said barrel, said conical barrier section having barrier grooves on the inside of said conical barrier section; said rotor being positioned relative to said barrier section so that said smooth conical section on said rotor is positioned on the interior of said barrier grooves, said materials being transported though said barrier grooves past said smooth conical section on said rotor;

said rotor being movable longitudinally relative to said barrel and to said conical barrier section between a first and a second position, said smooth conical section closing said barrier grooves in said first position and said barrier grooves being fully open in said second position, said rotor being longitudinally movable between said first and said second positions to partially restrict material flow through said barrier grooves to change the amount of strain on said materials when passing through said barrier grooves.

2. The apparatus of claim 1 wherein said conical barrier section includes first and second sets of barrier grooves.

3. The apparatus of claim 2 wherein said first set of barrier grooves comprise receiving grooves, said receiving grooves having an initial maximum volume at an upstream end, the volume of said receiving grooves progressively decreasing longitudinally to a final volume of zero at a downstream end; the second set of barrier grooves comprising sending grooves having a initial volume of zero at an upstream end and progressively increasing longitudinally to a maximum volume at the downstream end, said receiving grooves and said sending grooves being separated by barriers extending radially inward and longitudinally, whereby fluent material is transported between said barriers and said smooth conical section of said rotor from said receiving grooves to said sending grooves.

4. The apparatus of claim 3 wherein discharge port are located at the downstream ends of said receiving grooves whereby material insufficiently fluent to pass between said barriers and said smooth conical section of said rotor are discharged from said barrel.

5. The apparatus of claim 4 including a member positioned on the exterior of said discharge ports, said member including openings of varying size positionable over said discharge ports to determine the maximum size of material to be discharged through said discharge ports.

6. The apparatus of claim 1 wherein the said barrier grooves are formed by barriers extending radially inward and longitudinally, said longitudinally shiftable smooth conical section on said rotor comprising means for changing the capacity of said apparatus.

7. The apparatus of claim 6 wherein said means for changing the capacity of said extruder comprises means for controlling the temperature of the apparatus.

8. A method for controlling the capacity of an extruder and for controlling the temperature of extrusion and the power input to the extruder without changing the screw speed of the extruder comprising the steps of:

transporting material through extrusion grooves on a rotor positioned within an upstream barrel section;

transferring the material from the extrusion grooves on the rotor to receiving barrier grooves on an interior surface of a conical barrier section comprising an extension of the upstream barrel section:

transferring the material downstream from receiving barrier grooves to sending barrier grooves by transporting the material between a smooth conical section on the rotor and barriers separating the receiving grooves and the sending grooves;

transferring the material from the barrier grooves on the interior surface of the barrier section to extrusion grooves on the rotor positioned within a downstream barrel section; and shifting the rotor to change the clearance between the smooth conical section on the rotor and the barriers separating the receiving grooves and the sending grooves between a first downstream position closing said clearance and a second upstream position in which said clearance is fully open, whereby substantially adiabatic extrusion of different materials may be carrier out by adjusting the relative position of the smooth conical section on the rotor relative to the barriers.

* * * * *